(12) United States Patent
Forestier et al.

(10) Patent No.: US 6,181,486 B1
(45) Date of Patent: Jan. 30, 2001

(54) OPTICAL ARCHITECTURE FOR INFRARED VIEWING SYSTEM

(75) Inventors: Bertrand Forestier, Montreuil; Joël Rollin, Montigny le Bretonneux; Dominique Ragot, Poissy, all of (FR)

(73) Assignee: Thomson-CSF, Paris (FR)

( * ) Notice: Under 35 U.S.C. 154(b), the term of this patent shall be extended for 0 days.

(21) Appl. No.: 09/380,605

(22) PCT Filed: Mar. 10, 1998

(86) PCT No.: PCT/FR98/00477

§ 371 Date: Sep. 14, 1999

§ 102(e) Date: Sep. 14, 1999

(87) PCT Pub. No.: WO98/41892

PCT Pub. Date: Sep. 24, 1998

(30) Foreign Application Priority Data

Mar. 14, 1997 (FR) .................................... 97 03080

(51) Int. Cl.⁷ ............................... G02B 9/00; G02B 9/08; G02B 13/14; G02B 23/00
(52) U.S. Cl. ........................... 359/738; 359/355; 359/407; 359/733
(58) Field of Search ..................................... 359/738–740, 359/354–357, 407, 418, 676, 683, 726, 733, 754–757, 763–764; 250/352–353

(56) References Cited

U.S. PATENT DOCUMENTS

| | | | |
|---|---|---|---|
| 4,521,068 | * | 6/1985 | Schulte In Den Baumen ..... 250/353 |
| 4,840,465 | | 6/1989 | Loy et al. .............................. 359/669 |
| 4,902,098 | | 2/1990 | Rollin et al. .......................... 359/669 |
| 4,907,867 | | 3/1990 | Perrin et al. .......................... 359/694 |
| 4,972,085 | * | 11/1990 | Weber et al. .......................... 250/352 |
| 5,013,142 | | 5/1991 | Rollin et al. .......................... 359/674 |
| 5,202,792 | | 4/1993 | Rollin .................................... 359/356 |
| 5,247,173 | | 9/1993 | Benchetrit et al. ................... 250/230 |
| 5,444,250 | * | 8/1995 | Hanke .................................... 250/352 |
| 5,802,335 | * | 9/1998 | Sturlesi et al. ........................ 359/364 |

* cited by examiner

*Primary Examiner*—Georgia Epps
*Assistant Examiner*—Jordan M. Schwartz
(74) *Attorney, Agent, or Firm*—Oblon, Spivak, McClelland, Maier & Neustadt, P.C.

(57) ABSTRACT

An optical architecture for an infrared vision system for binoculars or a camera. This system includes a front afocal, a scanner, an optical device forming an image of the scene and a cooled detector with cold stop. This architecture has an aperture stop which is seperate from the cold stop thereby causing varaitons in the structure flux over the extent of the detector. These varations are corrected by a suitable shape of the cold stop which smooths out the photometric inefficiency over the extent of the detector and decreases the photometric inefficiency.

20 Claims, 10 Drawing Sheets

OPTICAL ARCHITECTURE FOR INFRARED VIEWING SYSTEM

BACKGROUND OF THE INVENTION

1. Field of the Invention

The invention relates to the field of optical architectures for an infrared vision system, which can be applied especially to a pair of binoculars or to a camera.

2. Dissussion of the Background

In a known manner, an optical architecture for an infrared vision system generally includes a front afocal, one of the functions of which is to collect the flux from a scene, an optical device forming an image of the scene and a cooled detector with its cold stop.

So-called first-generation cameras include scanning means which scan the scene two-dimensionally, that is to say horizontally and vertically. The detector is a quasi-point detector, that is to say a small matrix of elementary detectors having one or a few of these elementary detectors in each of two dimensions—horizontal and vertical. This detector therefore operates in AC mode, that is to say by eliminating the continuous component; it therefore takes into account only the variations in the signal during the scanning.

So-called second-generation cameras include a front afocal preferably of the Kepler type, scanning means which preferably include a mirror rotating about a vertical axis of the scene and allowing horizontal scanning of the scene, an optical device forming an image of the scene and a detector of the linear-array type, that is to say having a large number of elementary detectors in the vertical direction covering the entire scene in the vertical dimension, with a TDI effect (Time Delay Integration: that is to say the linear array is in fact a matrix having a few elementary detectors in the horizontal direction which "see" in succession the same point of the scene and the measured values of which, for the same point, are averaged). Throughout the rest of the text, the mirror of the scanning means will be referred to as the "scanner". The detector operates in DC mode, that is to say by preserving the continuous component of the signal, so as not to lose contrast of the scene in the vertical direction. These cameras exhibit good photometric performance but require, on the one hand, the use of a re-imager which is composed of several optical elements, usually lenses, and the function of which consists in transporting the image of the aperture stop, which is at the cold stop, onto the scanner. On the other hand, these cameras require the use of a reference temperature which, for example may consist of a black body which will be "seen" by the detector by virtue of a slight overscanning of the scene by the scanning means, whereby allowing the elementary detectors of which the detector is composed to be homogenized. The above two components—re-imager and temperature reference—are expensive and bulky components.

U.S. Pat. No. 4,972,085 describes an example of an optical architecture according to the prior art, having a re-imager producing an image close to the cold screen.

Hence the idea of devising a simplified optical architecture while preserving the photometric properties of second-generation cameras.

This means using unconventional solutions to solve the usual problems, which will therefore make it possible to achieve very compact combinations for portable and high-performance equipment. The main characteristic resides in the omission of the very expensive and very bulky re-imager; this inevitably results in a certain degradation of the photometric performance. It is then possible to make the architecture photometrically sound by a few modifications of the original optical architecture, in particular by modifying the shape of the cold of the cooled detector.

SUMMARY OF THE INVENTION

A preferred form of the invention may be summarized in the following manner.

For cost and bulkiness reasons, the re-imager is omitted. Since the aperture stop is no longer imaged on the scanner, the size of the latter has a tendency to increase. Throughout the rest of the text, the term "stop" will be used to denote the physical embodiment of the aperture stop. In order to minimize the size of the scanner, it is necessary to move the aperture stop away from the cold stop and to move it closer to the scanner. Since the aperture stop is moved away from the cold stop, the total aperture of the latter becomes oversized with respect to the useful aperture of the camera and a large part of the structure flux reaches the detector; as may be seen below, this may become troublesome since this structure flux is by definition spurious flux, as opposed to the useful flux of the signal of the observed scene. A first-order photometric correction is possible by placing the conjugating mirror in such a way that, apart from the useful flux, the detector now sees only the cold flux.

However, the structure flux problems are not completely solved because of the residual spurious flux which will be explained in detail below. A second-order photometric correction is obtained by giving the cold stop a particular shape.

The invention therefore provides an optical architecture for an infrared vision system with an optical axis, having an aperture stop, and comprising, in sequence:

a front afocal, scanning means which carry out horizontal scanning of the scene, an optical device forming an image of the scene, cooled detection means which include a linear-array-type detector located in the focal plane of the device and a cold stop, characterized in that:
 the optical device is a simple imager having one lens and being as close as possible to the scanning means,
 the aperture stop is located at the lens of the simple imager and is physically formed by a conjugating mirror which delimits it and the reflecting face of which is turned towards the detector,
 the cold stop has a shape such that the photometric inefficiency is smoothed out over the extent of the detector and/or is decreased.

The above considerations relate to a preferred embodiment of the invention which makes it possible to solve the more general problem, which is to smooth and/or decrease the photometric inefficiency over the extent of the detector when this inefficiency is due to the appearance of spurious structure flux, which appearance results from the fact that the aperture stop is separate from the cold stop.

This problem can be solved, according to another subject of the invention, by any optical architecture in which the cold stop is given a suitable particular shape.

Another aspect of the invention therefore provides an optical architecture for an infrared vision system with an optical axis, having an aperture stop, and comprising, in sequence:

means allowing the flux from a scene to be collected, an optical device forming an image of the scene, cooled detection means which include a detector located in the focal plane of the device and a cold stop, characterized in that the aperture stop is separate from the cold stop, the cold stop has a shape such that the photometric inefficiency is smoothed out over the extent of the detector and/or is decreased.

BRIEF DESCRIPTION OF THE DRAWINGS

The invention will be more clearly understood and other features and advantages of this invention will appear with the aid of the description below and of the appended drawings in which.

Identical numbers on the various figures refer to identical components.

DETAILED DESCRIPTION OF THE PREFERRED EMBODIMENTS

Figure 1:
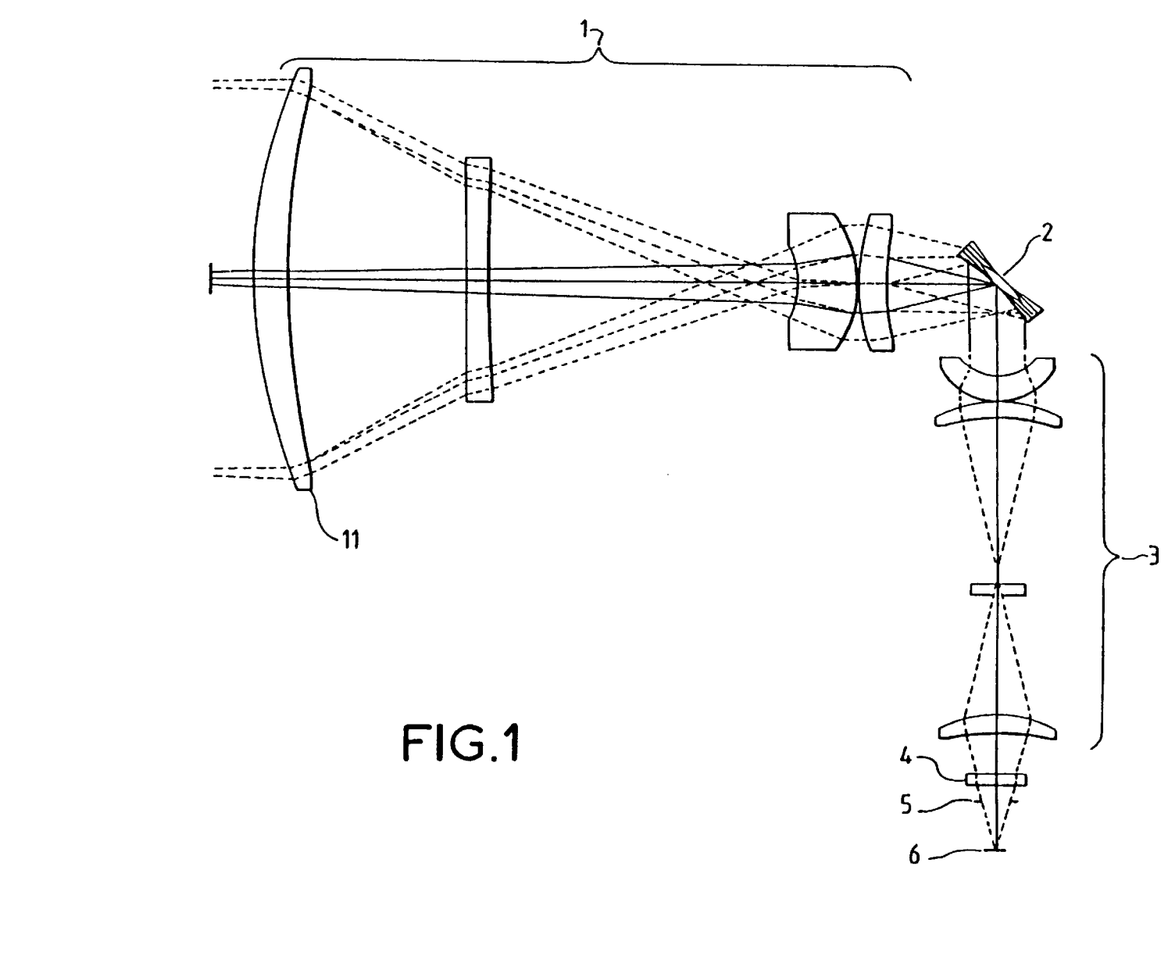
FIG. 1 illustrates an example of an optical architecture of a so-called second-generation camera with a re-imager, according to the prior art.

The invention relates to the field of optical architectures for an infrared vision system, especially those used in binoculars or cameras. Illustrated in FIG. 1 is the optical architecture of a camera according to the prior art. This optical architecture may be split into four main blocks, which are the front afocal 1 allowing the scene flux to be collected, the scanner 2 allowing the horizontal scanning of the scene to be carried out, the re-imager 3 allowing an image to be transported and detection means 4, 5, 6 allowing the scene flux to be received, as well as means for processing the downstream signal, these not being illustrated here, allowing the information contained in the scene flux to be exploited.

Since this optical architecture is a system centred on an optical axis, it has an aperture stop which is physically formed within this architecture by a stop. In order for the aperture stop to be independent of the position of the scanning by the scanner 2, the stop is located downstream of the scanner 2, the direction of the axis of the optical architecture going from the front lens 11 to the detector 6. The images of the aperture stop by the various parts of the optical architecture are pupils.

The front afocal 1 is preferably of the Képler type, that is to say it is composed of two converging lenses or groups of lenses; preferably, it also includes a diverging intermediate lens or a group of lenses, the functions of which are, for example, aberration correction, near focusing, athermalization and field changing. It includes a front lens 11. The quantity of scene flux collected is directly related to the diameter of the front lens 11. In order to minimize its diameter, the front lens 11 is given the role of entrance pupil of the optical architecture by bringing the image of the aperture stop near this front lens 11.

The scanner 2 is a rotating mirror which allows horizontal scanning of the scene, and the rotation axis of which is vertical with respect to the scene. In order to avoid the image of the stop by the scanner 2 being dependent on the scanning position of the scanner 2, the axis of rotation of the scanner 2 must be close to the reflecting surface so as to almost completely eliminate the pupil shift which otherwise would inevitably occur during scanning. The pupil shift consists of a ray shift which is undesirable since it forces the size of the front lens 11 to be artificially increased. This is because for each different scanning position, the entrance pupil shifts over the front lens 11. Consequently, in order for the front lens 11 to cover all the ray traces, the total aperture of the front afocal 1 must be greater than its instantaneous aperture which corresponds to the trace of a ray for one scanning position. In the absence of pupil shift, the total aperture of the front afocal 1 may therefore be limited to its instantaneous aperture, this being the case with the invention.

The re-imager 3 allows the image of the observed scene to be transported from the scanner 2 to the detection means 4, 5, 6. It is composed of two lenses or groups of lenses generally comprising aspherical surfaces. The re-imager is therefore an expensive and bulky component. In addition, it is particularly sensitive to thermal drift, since the thermal defocusing of its successive lenses is additive, generating "serrated" phenomena, described below, at the detector 6, which greatly degrade the quality of the image. A correction by self-athermalization of the re-imager 3 remains possible, but this is also expensive.

The detection means 4, 5, 6 are firstly composed of a detector 6 located in the focal plane of the optical architecture. This detector 6 is a detector of the linear-array type, that is to say this detector is a matrix of elementary detectors, having one or a few elementary detectors in the horizontal direction of the scene and having a large number of elementary detectors in the vertical direction of the scene so as to cover the entire vertical dimension of the scene. This detector does not necessarily have a perfectly rectangular shape. Thus, the detector used is a 288×4 SOFRADIR detector with a TDI effect (see above). It possesses 288 rows each of 4 detectors and has a staggered structure, that is to say the odd and even rows of elementary detectors are offset; more specifically, the two columns of odd rows, or alternatively even rows, are composed of 144 successions each comprising one row of elementary detectors followed by one empty row, or alternatively one empty row followed by a row of elementary detectors. The "serrated" phenomenon of the previous paragraph results from a mismatch in the retardations between the odd and even rows, these retardations depending on the focal point of the optical architecture. This detector 6 is cooled by a cold finger, not illustrated here, which is extended by a cold screen, not illustrated here, having an aperture which is a cold stop 5 according to a well-known technique; a protective window 4, transparent to the infrared radiation or at least to certain sub-bands of the infrared radiation, makes it possible to close off the cryogenic enclosure in which the detector 6 is therefore placed.

In this architecture, the stop is coincident with the cold stop 5 and hence only the scene flux, that is the useful flux, reaches the detector 6, thereby making it possible to overcome the problems of structure flux which, by definition, is spurious flux. When observing a scene of uniform temperature, the intensity of the image obtained exhibits a dome in its vertical dimension which arises from the fact that the projected solid angle for each elementary detector depends on its position along the detector 6. This dome is compensatable at calibration by a signal-processing operation carried out downstream of the optical architecture. In order for the stop to actually act as an aperture stop, neither the front afocal 1 nor the re-imager 3 must vignette the useful rays.

In order to minimize the size of the scanner 2, the stop, coincident with the cold stop 5, is imaged on the scanner 2 by means of the re-imager 3.

Therefore, in view of the objectives of the invention, which are mainly to produce an optical architecture which is photometrically sound but is inexpensive and relatively simple, the conventional solution, which makes it possible to eliminate the spurious flux seen by the detector 6 through its protective window 4, by making the stop and the cold stop 5 coincide, and then by imaging the stop on the scanner 2, this image of the stop being itself imaged on the front lens 11 of the front afocal 1, must be discarded as unsuitable.

Figure 2A:
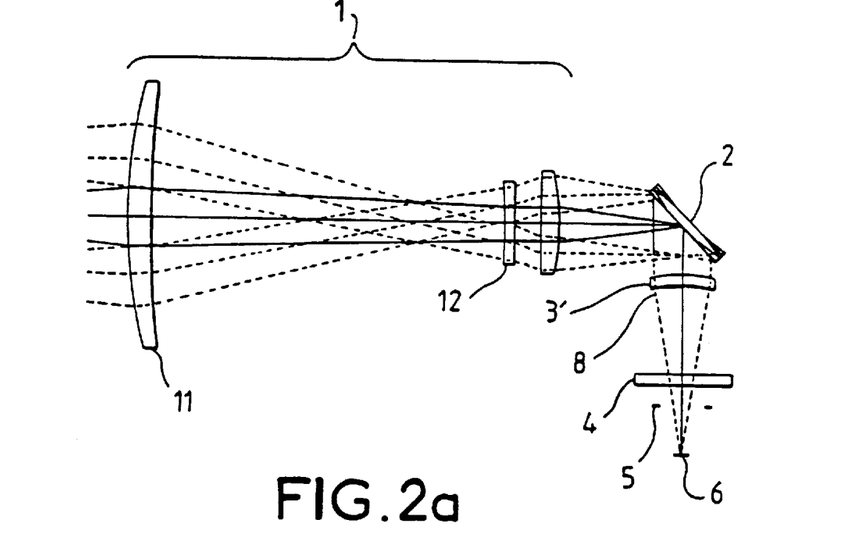
FIG. 2a shows a general optical architecture of a wide-field (WF) camera, according to the invention.
Figure 2B:
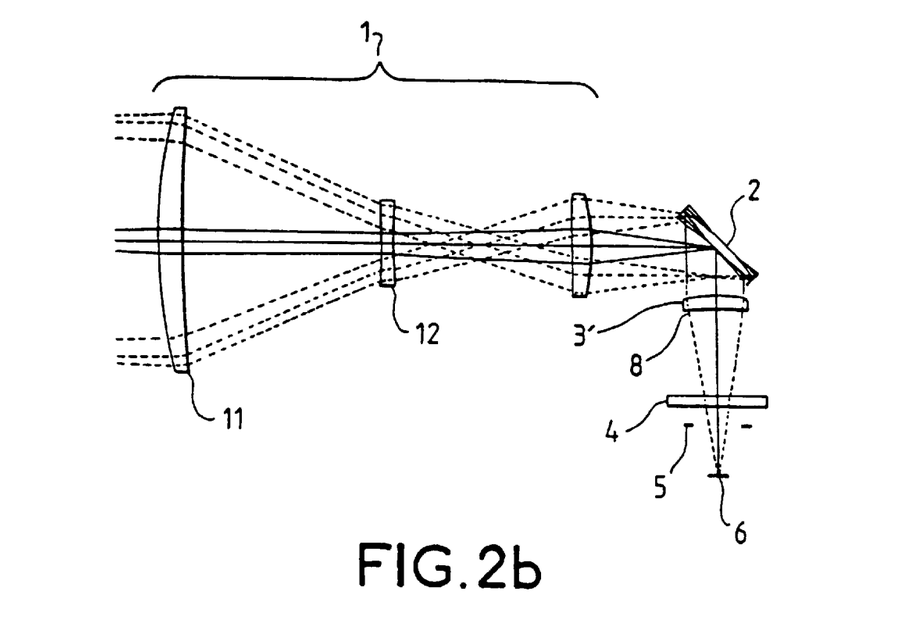
FIG. 2b shows a general optical architecture of a narrow-field (NF) camera, according to the invention.

The optical architecture of the invention has been designed for the purpose of preserving sound photometry while dispensing with the re-imager 3. Illustrated in FIGS. 2a and 2b are two configurations of the optical architecture of a camera according to the invention, respectively in wide field (WF) and in narrow field (NF). The architecture is therefore simpler—it comprises a front afocal 1 comprising a front lens 11, a scanner 2, a simple imager 3' comprising a lens, and a cooled detector 6 located in the focal plane of the optical architecture, this detector also having a protective window 4 and a cold stop 5.

The main effect of introducing a simple imager 3' with a lens, as a replacement for the re-imager 3 deemed to be too expensive and bulky is to move the aperture stop which is therefore no longer coincident with the cold stop 5.

The precise location of the stop 8 within the optical architecture is determined by the following considerations: if the stop is located in front of the scanner 2, for example in the front afocal 1, the useful flux received by the detector varies during scanning depending on the pupil aberrations of the front afocal 1.

These pupil aberrations of the front afocal 1 may then be corrected by a mask placed in the optical architecture, which mask would astutely vignette, at this point in the optical architecture, the pupil at the ends of the scan so as to make the flux received by an elementary detector of the detector 6 constant during the scanning. In order to avoid this, the stop 8 is therefore placed between the scanner 2 and the detector 6; the exit pupil of the optical architecture—the image of the aperture stop by the optical components located downstream of the aperture stop—remains invariant during scanning. This results in the absence of a dome in the horizontal direction in the image that the detector 6 gives of a uniform scene, which is advantageous, the processing of the signal used downstream of the optical architecture being capable of making a non-uniformity correction only in the vertical direction.

Preferably, the stop 8 is moved as close as possible to the scanner 2 for two reasons. The first is that the size of the scanner 2 is thus minimized. The second reason relates to the entrance pupil of the optical architecture. The entrance pupil is the image formed by the optical components located upstream of the stop 8, of this same stop 8. It is therefore necessary to distinguish between the horizontal entrance pupil, that is to say in the horizontal direction of the scene, and the vertical entrance pupil, that is to say in the vertical direction of the scene. This is because the image of the scene formed by the optical architecture does not move in the vertical direction since the scanning is horizontal. The vertical entrance pupil is therefore indeed the image of the stop 8. On the other hand, the horizontal scanning carried out by the scanner 2 causes the horizontal entrance pupil to be shifted horizontally at each scanning position. The horizontal entrance pupil for all the scanning positions of the scanner 2 is therefore the image of this same scanner 2. In order to minimize the size of the diameter of the front lens 11, which acts as the entrance pupil, it is necessary to minimize the shift between the horizontal and vertical pupils, that is to say to move the stop 8 as close as possible to the scanner 2.

The search for a compact optical architecture whose components are as small as possible therefore means that the aperture stop must be physically formed on the lens of the simple imager 3', that is to say the stop 8 must be positioned on this lens, and therefore means that the stop 8 must be as close as possible to the scanner 2, that is to say theoretically so as to be just clear of the latter; however, other considerations may cause the stop 8 to be a little distance away from its optimum position, which in turn will reduce the performance of the system, but this will nevertheless remain within the scope of the invention.

Figure 3A:
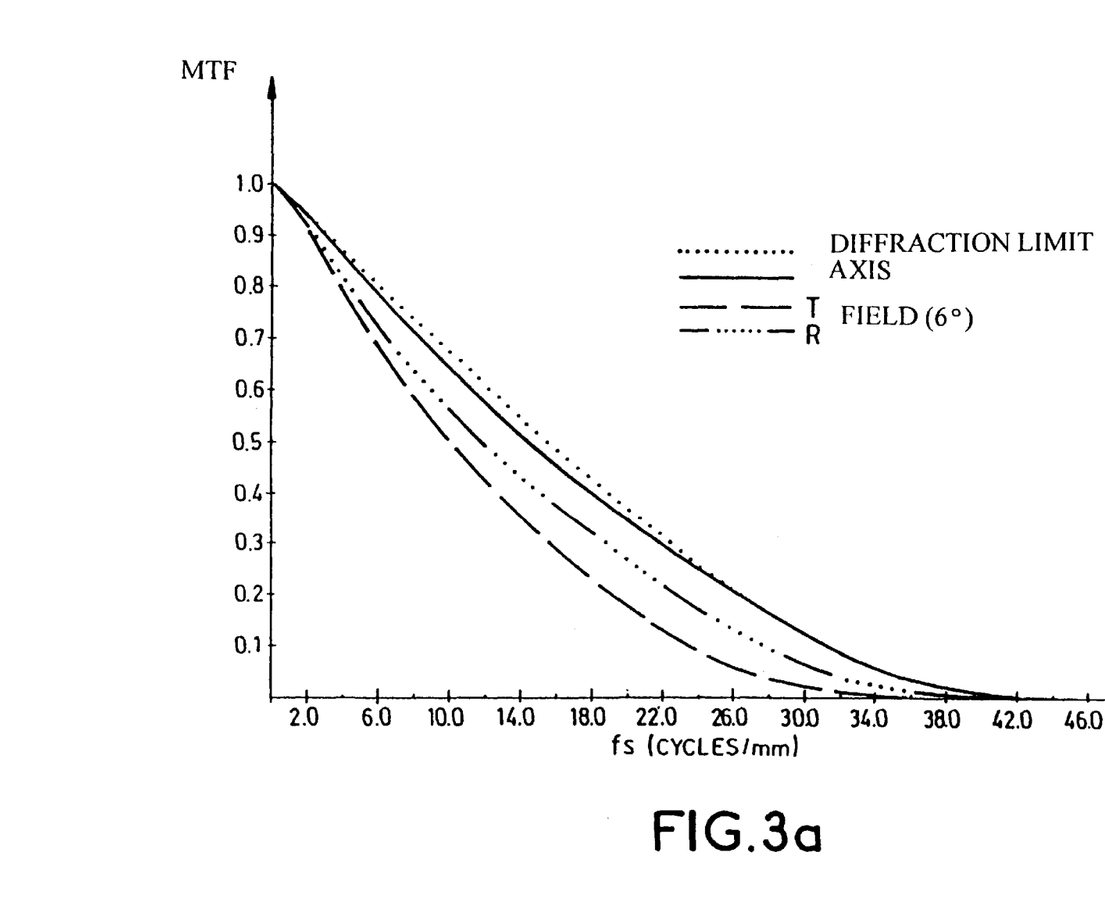
FIG. 3a shows the behaviour of the modulation transfer function (MTF) of the optical architecture of a camera, according to the prior art.
Figure 3B:
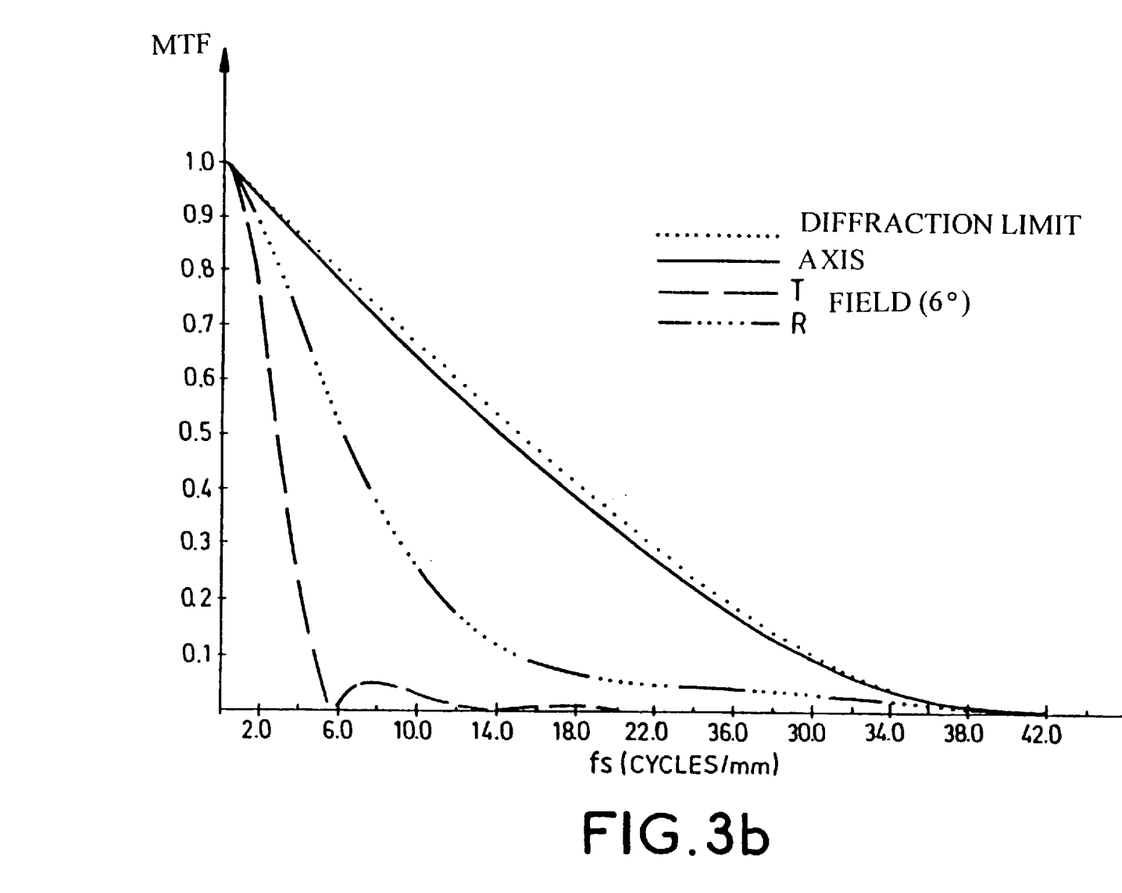
FIG. 3b shows the behaviour of the modulation transfer function (MTF) of the optical architecture of a camera, according to the invention.

A drawback of the simple imager 3' compared with the re-imager 3, as may be seen in FIGS. 3a and 3b, is the poor optical quality at the edge of the field. This optical quality may be seen in FIGS. 3a and 3b. FIG. 3a illustrates the case of an optical architecture with a re-imager according to the prior art and FIG. 3b illustrates the case of an optical architecture with a simple imager according to the invention. The modulation transfer functions (MTF) are plotted as a function of the spatial frequency (fs) in cycles/mm. Each figure shows the diffraction limit, the MTF along the axis and the MTF at the edge of the field, the curves being shown for a field of 6 degrees, sagittally or tangentially (T) on the one hand, and radially (R) on the other. With regard to the MTF along the axis, the case with a re-imager and the case with a simple imager exhibit equivalent performance: the MTF practically follows the diffraction limit. At the edge of the field, whether sagittally or radially, the MTF in the case with a re-imager remains relatively close to the diffraction limit, whereas the MTF in the case with a simple imager rapidly drops with spatial frequency. In practice, during tests with human operators, the optical quality obtained at the edge of the field for the applications envisaged has not proved to be a problem.

Since the stop 8 is upstream of the cold stop 5, spurious structure flux problems occur, these being directly associated with the photometric inefficiency of the optical architecture. The photometric inefficiency depends on the elementary detector in question, that is to say the $\Omega_{tot}(i)/\Omega_{use}(i)$ ratio for the i-th elementary detector, $\Omega_{tot}(i)$ being the total projected solid angle bounded by the cold stop 5 for the i-th elementary detector and $\Omega_{use}(i)$ being the useful projected solid angle bounded by the stop 8 and possibly vignetted by the cold stop 5. The photometric inefficiency is the inverse of what is conventionally called the photometric efficiency. It is high and very inhomogeneous. The spurious structure flux is an important parameter which influences the photometric inefficiency.

Figure 4A:
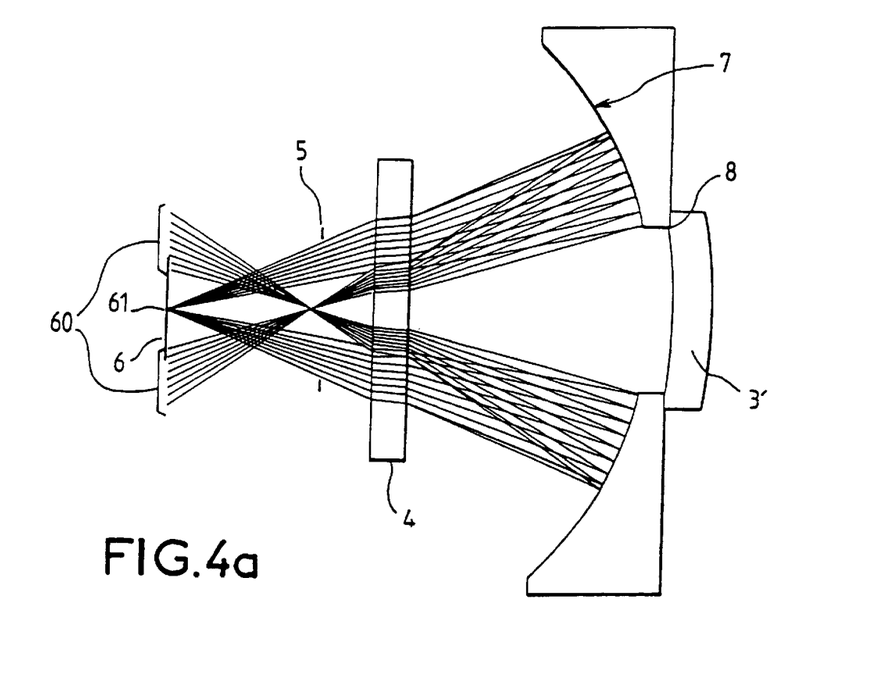
FIG. 4a shows the reduction in the structure flux due to the conjugating mirror of a camera (in the case of an elementary detector located at the centre of the detector), according to the invention.
Figure 4B:
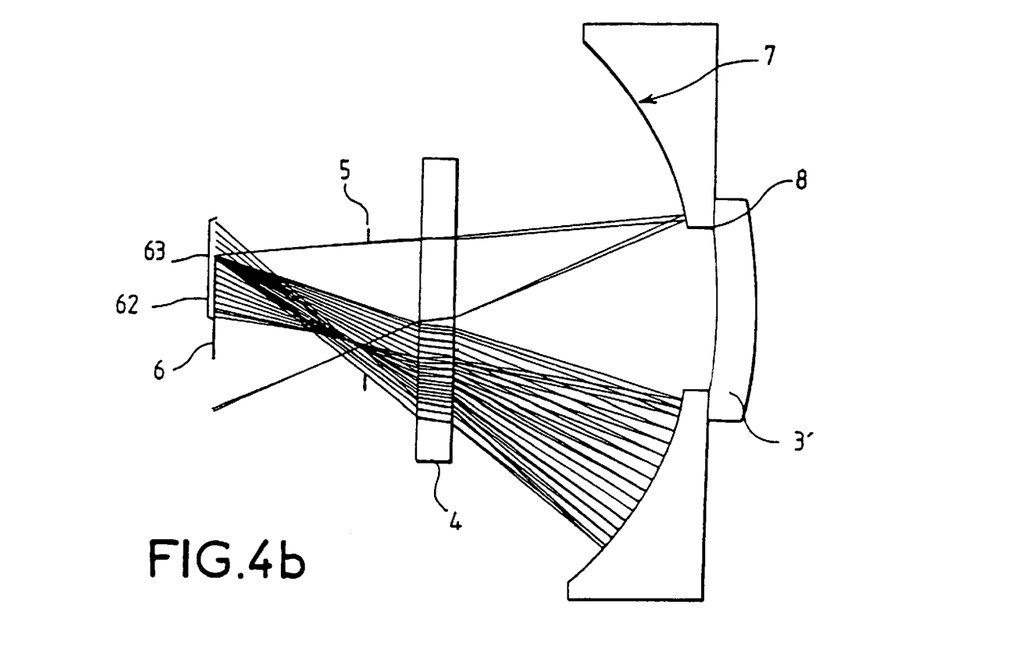
FIG. 4b shows the reduction in the structure flux due to the conjugating mirror of a camera (in the case of an elementary detector located at the edge of the detector), according to the invention.

A first remedy consists in reducing this spurious structure flux by using the conjugating mirror 7 to delimit the stop 8, as may be seen in FIGS. 4a and 4b, in such a way that the detector 6, apart from the useful flux which has passed through the stop 8, now sees only the very cold flux coming from inside the cryogenic enclosure instead of the hot flux which came from inside the camera. FIG. 4a illustrates a detailed part of the optical architecture comprising the simple imager 3', the protective window 4, the cold stop 5, the detector 6, the conjugating mirror 7 and the stop 8. Tracing of the light rays shows from which parts 60 of the internal structure of the camera the cold flux, received by the elementary detector 61 located at the centre of the detector 6, comes; this also gives an idea of the total projected solid angle $\Omega_{tot}(61)$ seen by this elementary detector 61. In FIG. 4b, tracing of the light rays shows from which parts 62 of the internal structure of the camera the cold flux, received by the elementary detector 63 located at the edge of the detector 6, comes. The total projected solid angle $\Omega_{tot}(63)$ seen by this elementary detector 63 is smaller than that seen by the detector 61. Because of the position of the stop 8 being relatively further away from the detector 6 than that of the cold stop 5, the variations along the detector 6 of the useful projected solid angle $\Omega_{use}(i)$ for the i-th elementary detector are markedly smaller than those of the total projected solid angle $\Omega_{tot}(i)$ and may be regarded as being negligible.

Figure 5A:
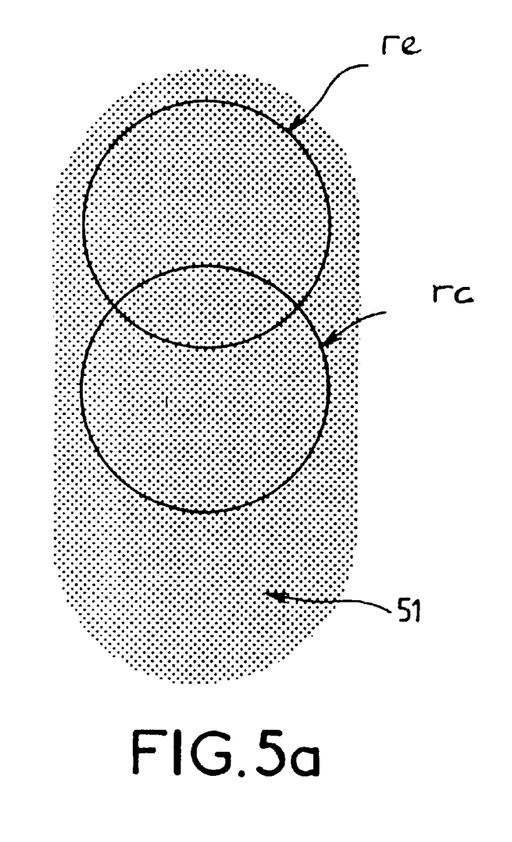
FIG. 5a illustrates the hippodrome shape of the cold stop of the detector of a camera, according to the prior art.

However, the reflection coefficient of the spherical conjugating mirror 7 is less than 1, since it is slightly diffusing and emissive, and the transmission coefficient of the protective window 4 of the detector 6 is also less than 1 since its absorption coefficient is non-zero; the window 4, in contact with the body of the cryogenic enclosure which is hot, itself emits hot flux which reaches the detector 6 directly or by reflection off the spherical conjugating mirror 7. The structure flux which is then received by the detector 6 is spurious flux which is not negligible and the effect of which is accentuated by the fact that the internal temperature of the camera is usually very much higher than the temperature of the scene. Moreover, this spurious flux does not have the same value depending on whether the elementary detector in question is at the centre of the detector—the case in FIG. 4a—or at the edge of the detector—the case in FIG. 4b—since the value of the total projected solid angle varies. Consequently, since the value of the useful projected solid angle remains approximately constant, the photometric inefficiency—the ratio of the total projected solid angle to the useful solid angle—is high and also varies greatly from one row of the detector 6 to the other. When the stop 8 does not coincide with the cold stop 5, the latter necessarily has, as may be seen in FIG. 5a, a hippodrome shape 51; if it is desired to avoid any vignetting of the useful rays, whether these are the rays rc reaching the centre of the detector 6 or the rays re reaching the edge of the detector 6. However this simple and natural shape 51 of the cold stop 5 results in a high and inhomogeneous photometric inefficiency when the stop 8 is separate from the cold stop 5; this is unacceptable since it means that there is too great a range of temperature variation, of the order of some ten degrees, which results in saturation of the coder of the signal-processing part located downstream of the optical architecture.

Figure 5B:
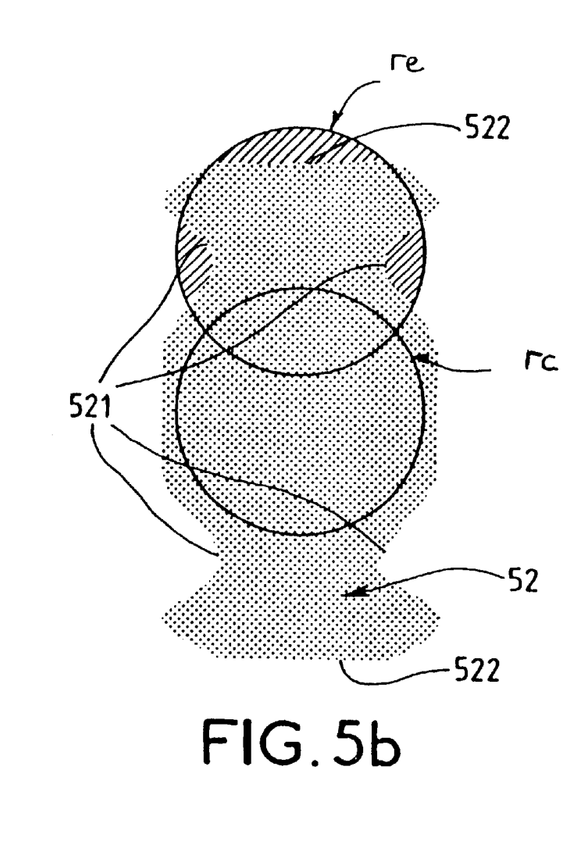
FIG. 5b illustrates the optimized shape of the cold stop of the detector of a camera, according to the invention.

Since it is not possible to eliminate the spurious structure flux, attempts may be made to overcome its effects. To do this, FIG. 5b illustrates a particular computer-optimized shape 52 of the cold stop 5 according to the invention, which astutely vignettes the rays re, the vignetting being illustrated by the hatched parts. In addition, it may be seen that this optimized shape 52 does not affect the aperture of the camera at the centre of the field, since it does not vignette the useful rays rc reaching the centre of the linear array.

This shape 52 of the cold stop 5 has approximately the shape of a hippodrome, having its large dimension in the vertical direction of the scene, having indentations 521 at the vertical sides, these indentations being four in number and being symmetrical in pairs with respect to the horizontal and vertical axes of symmetry, and having flattened upper and lower ends 522.

More specifically, this shape 52 of the cold stop 5 is defined as the surface around the origin bounded by the following equations, y being the ordinate along the vertical axis of the scene and x the abscissa:

$|y|=4.25$ $|x|=[2.45-0.56(1-\cos(0.49y^2))]$ or any surface homothetical to the latter.

The astute vignetting of the useful rays re produced by the shape 52 of the cold stop 5 will make it possible to smooth out the photometric inefficiency from one edge of the detector 6 to the other and will also reduce this photometric inefficiency. Varying the shape of the cold stop 5 thus makes it possible to minimize the variations in the photometric inefficiency along the detector 6, as may be seen in FIG. 6. Curve A in fact illustrates the variations in the photometric inefficiency along the detector 6 in the case of the hippodrome shape 51 of the cold stop 5 and curve B in the case of the optimized shape 52. Curve B shows an approximately constant photometric inefficiency along the detector 6, whereas that of curve A varies significantly, and in addition that of curve B is less than that of curve A.

Figure 6:
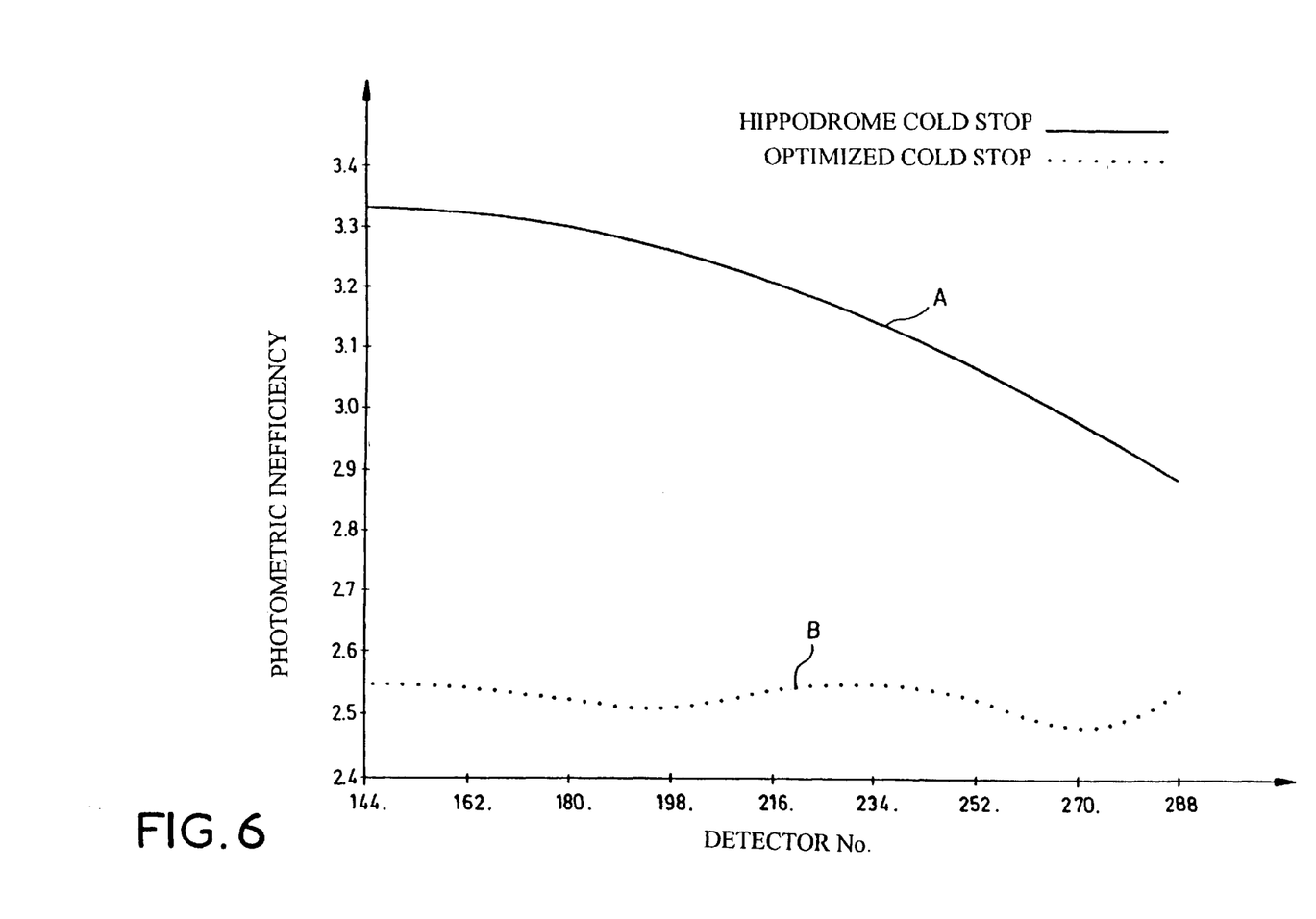
FIG. 6 illustrates the variations in the photometric inefficiency along the detector, according to various shapes of the cold stop.

The computer-optimized shape 52 of the cold stop 5 provides a double benefit, as may be seen in FIG. 6: firstly, the residual dome of the photometric inefficiency, that is to say the variation in the photometric inefficiency along the detector, is reduced by a factor of about 7 between curve A and curve B; secondly, the average value of the photometric inefficiency is substantially smaller in curve B than in curve A. With the camera operating in DC mode, the inhomogeneity of the photometric inefficiency means that, in the image of a scene of uniform temperature, the dome may be seen in the vertical direction which can be compensated for at the start, during calibration, but which will reappear as it depends on the internal temperature of the camera, which varies. Compensation by calibration would therefore be ineffective.

The other advantage of this solution, relating to the reduction in the influence of the spurious flux, is that it entails no additional cost since the cost of cutting the cold stop 5 is independent of the shape of the latter.

The other solutions that may be envisaged are markedly more expensive and not necessarily more effective. It would be conceivable to improve the reflection coefficient of the spherical conjugating mirror 7. However, apart from the relatively small effect of this parameter, its improvement would necessitate having to use a costly diamond machining operation allowing optical precision to the level of the roughness of the surface of the mirror 7 to be obtained, whereas by optimizing the shape of the cold stop 5, a mechanical precision obtained by improved conventional machining of the mirror 7 may be sufficient. It would also be conceivable to reduce the emissivity of the window 4 by using less absorbent but more expensive materials than the standard germanium and by subjecting them to a special, likewise costly treatment.

In the more general case in which the aperture stop is separate from the cold stop, which causes the appearance of spurious structure flux at the detector, the solution recommended by the invention for obviating the effects of this spurious structure flux remains valid. The use of an optical architecture in which the cold stop is given a suitable special shape therefore makes it possible to smooth the photometric inefficiency over the extent of the detector and/or to reduce the photometric inefficiency.

More specifically, the optical architecture used is therefore an optical architecture for an infrared vision system with an optical axis, having an aperture stop. It comprises, in sequence, means allowing the flux from a scene to be collected, an optical device forming an image of the scene, cooled detection means which include a detector located in the focal plane of the device and a cold stop; the aperture stop is separate from the cold stop and the latter has a shape such that the photometric inefficiency is smoothed over the extent of the detector and/or is reduced.

Another problem already mentioned above stems from the fact that the horizontal pupil coincides with the mirror of the scanner 2, whereas the vertical pupil coincides with the stop 8. The two pupils—the horizontal and the vertical pupil—have already been moved as near as possible to each other. However, since these two pupils are still separate, the front lens 11 of the front afocal 1 cannot therefore act as the entrance pupil of the optical architecture, which in turn greatly increases its diameter and consequently its cost.

Figure 7A:
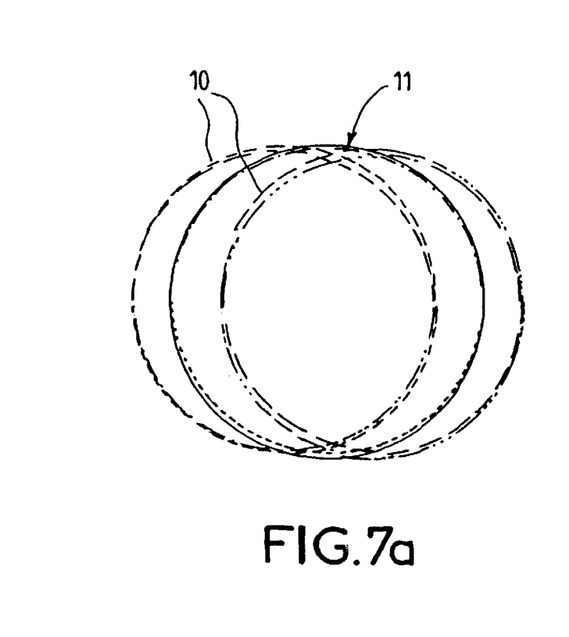
FIG. 7a illustrates the variations in the image of the entrance pupil on the front lens of the front afocal during scanning when the exit pupil of the front afocal is located on the image of the stop.
Figure 7B:
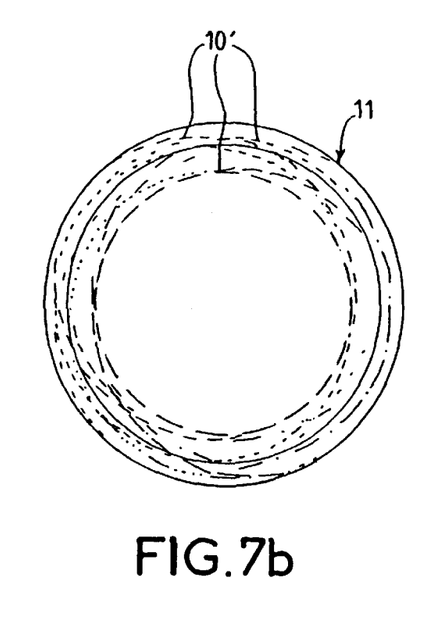
FIG. 7b illustrates the variations in the image of the entrance pupil on the front lens of the front afocal during scanning, when the exit pupil of the front afocal is located between the scanner and stop.
Figure 7C:
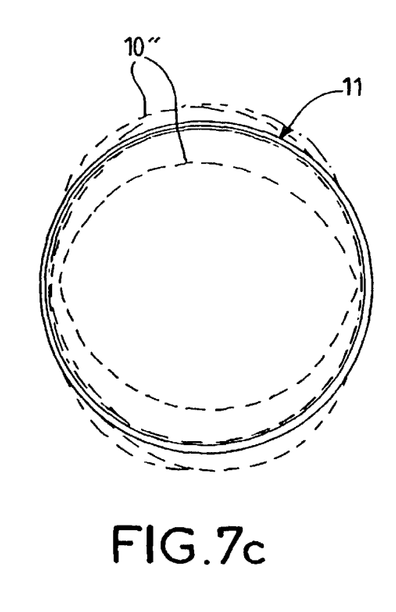
FIG. 7c illustrates the variations in the image of the entrance pupil on the front lens of the front afocal during scanning, when the exit pupil of the front afocal is located on the scanner.

The front afocal 1 is of the Képler type, that is to say its exit pupil can be imaged near the scanner 2 while preserving its entrance pupil near its front lens 11. Since the exit pupil of the front afocal 1 is imaged on the scanner 2, which coincides with the horizontal pupil of the entire optical architecture, the horizontal entrance pupil of the entire optical architecture is therefore near the front lens 11. The diameter of the front lens 11 is minimized by reducing it to the size of the horizontal entrance pupil of the entire optical architecture. In FIGS. 7a, 7b, 7c respectively, the images 10, 10', 10", illustrated in dotted lines, of the entrance pupil on the front lens 11 of the front afocal 1 vary depending on the position of the exit pupil of the front afocal 1 within the optical architecture. FIG. 7a shows the horizontal shift of the image 10 on the front lens 11 of the front afocal 1 when the exit pupil of the front afocal 1 is located on the image of the stop 8. FIG. 7b shows the two-dimensional shift of the image 10' on the front lens 11 of the front afocal 1 when the exit pupil of the front afocal 1 is located between the scanner 2 and the stop 8. FIG. 7c shows the vertical shift of the image 10" on the front lens 11 of the front afocal 1 when the exit pupil of the front afocal 1 is located on the scanner 2. In the most unfavourable narrow-field configuration, as may be seen in the case of FIG. 7c, this results in slight vertical vignetting of the useful rays, which may therefore be corrected by signal processing located downstream of the optical architecture, it being possible for the signal-processing system to homogenize the signal in the vertical direction. In the wide-field configuration, there is no vignetting of the useful rays.

A second improvement over the existing systems is the elimination of the temperature reference. Usually, the thermal drift of the elementary detectors is compensated for by a temperature reference, of the black-body type, located in the intermediate focal plane of the front afocal 1, so that all that is required is slight overscanning of the scene by the scanner 2 in order to ensure that all of the elementary detectors have uniform luminance. This temperature reference contained in the camera makes it possible to reset the detectors at each scan. However, apart from the fact that it is heavy and costly and has a high consumption, for a reliability which is not always optimum, the presence of this temperature reference is restrictive in terms of implantation of the optical architecture insofar as it necessitates having the intermediate focal plane of the front afocal 1 which is clear. In the present embodiment, since this temperature reference is absent, the vertical homogenization, that is to say the compensation of the drift of the various elementary detectors one with respect to another is carried out downstream of the optical architecture by signal processing. Once the drift of the elementary detectors one with respect to another has been compensated for by signal processing, the remaining average drift of all of the elementary detectors is small.

Figure 8:
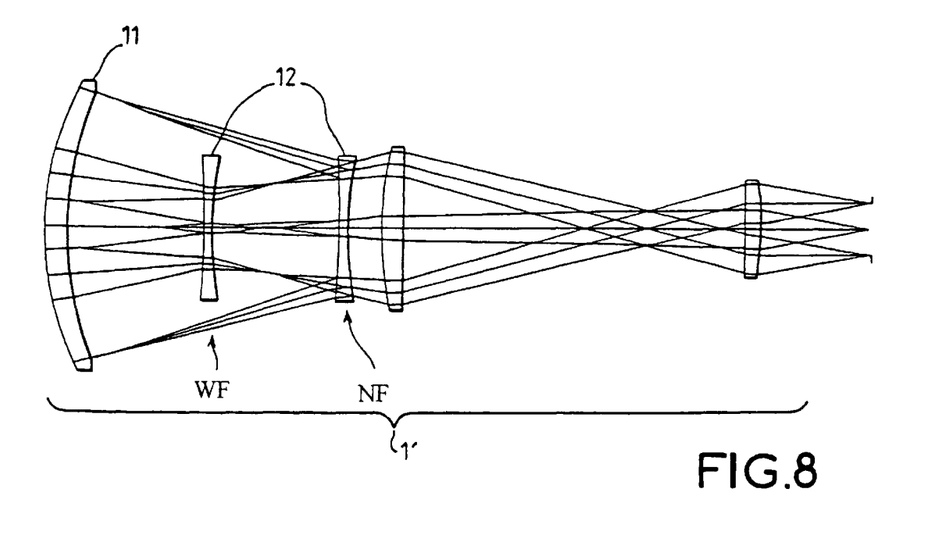
FIG. 8 illustrates the long afocal of the optical architecture of a camera, according to the prior art.
Figure 9:
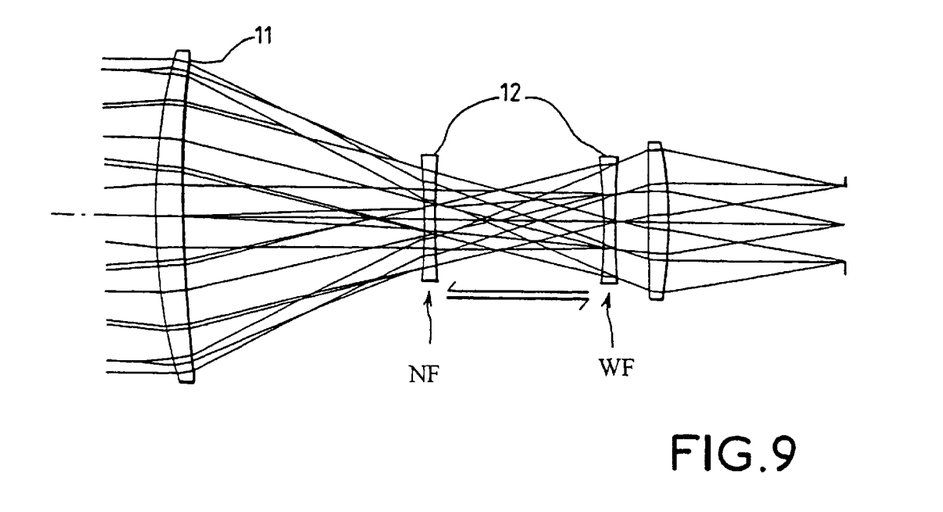
FIG. 9 illustrates the short afocal of the optical architecture of a camera, according to the invention.
Figure 10:
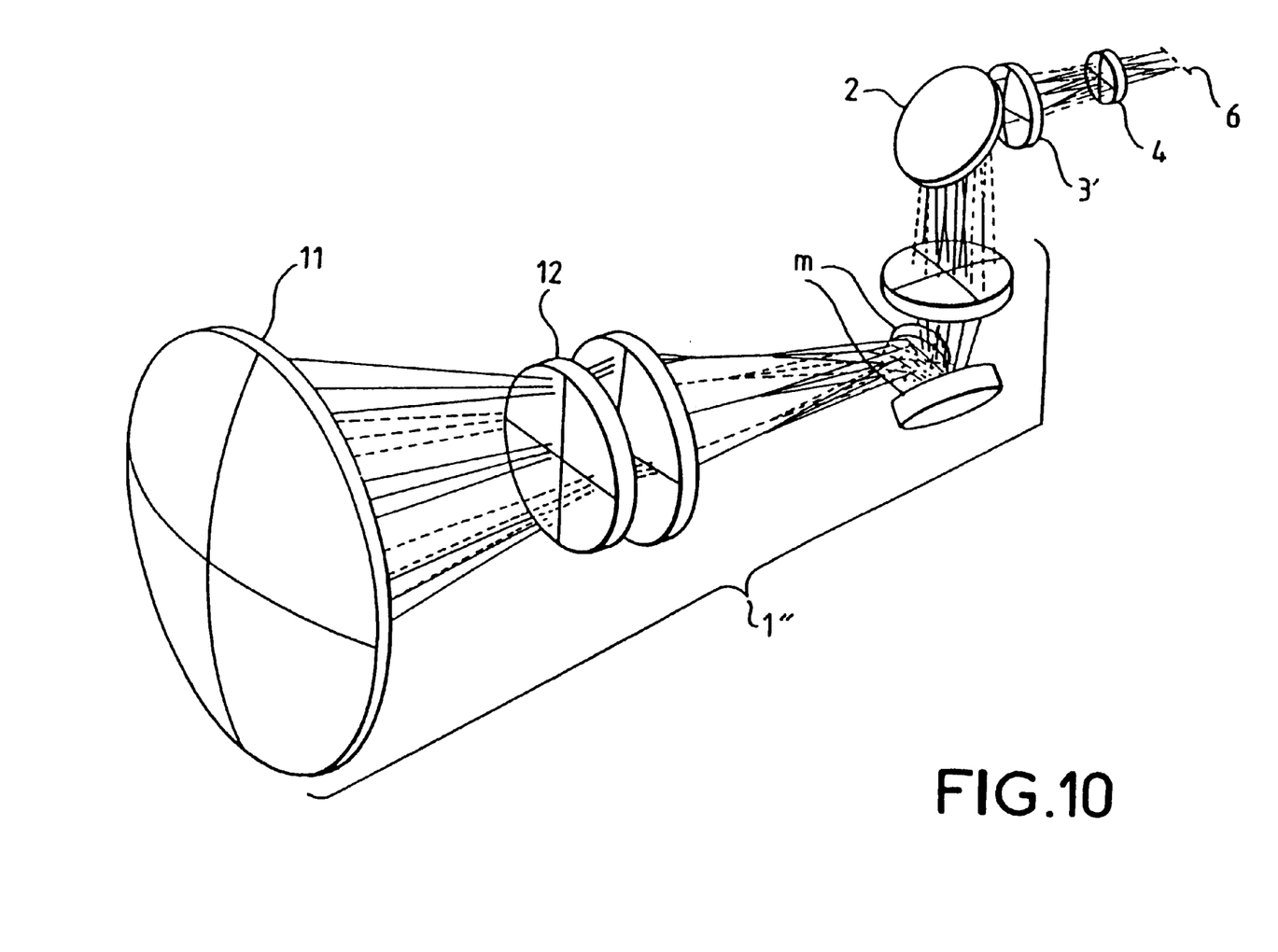
FIG. 10 shows an optical architecture of the camera in its foldable version, according to the invention.

It is advantageous to have cleared the intermediate focal plane of the front afocal 1, as this makes it possible to provide the field-changing function in a simple and inexpensive manner. In fact, there are two options for providing the field-changing function, that is to say the switching between the wide-field (WF) mode and the narrow-field (NF) mode: this either consists in making a group of lenses in the front afocal rock or it consists in making one of the intermediate lenses of the front afocal free to move translationally. In this second option, illustrated in FIG. 8, the so-called "field-changing" lens 12 is normally the second lens 12 of a long front afocal 1' having at least four lenses. This field-changing lens 12 is illustrated in its two positions—wide field (WF) and narrow field (NF). The fact that the intermediate focal plane has been cleared makes it possible, according to the invention, to reduce the number of lenses. In fact, provision has been made according to the invention to use a short three-lens afocal, benefiting from the fact that the field-changing second lens can cross the intermediate focal plane of the front afocal, something which is impossible when a temperature reference already occupies this intermediate focal plane. FIG. 9 illustrates a short afocal 1 according to the invention, the use of which is made possible by the absence of the temperature reference. The field-changing lens 12 also allows close focusing of the entire optical architecture; it is also possible to compensate for the defocusing due to any thermal drift. However, the consequence of using a short front afocal 1, that is to say having three lenses, is that it cannot be folded because the mirrors allowing foldability of the front afocal 1 must necessarily be small and consequently necessarily be located near the intermediate focal plane of the front afocal 1. A foldable option of the invention is illustrated in FIG. 10. The front afocal 1'' is foldable, but this is a long, that is to say four-lens, front afocal, comprising mirrors m.

Optimization of the parameters in the context of the invention, carried out in the case of the embodiment described, results in the following characteristics:

useful spectral band: 7.5–10.5 $\mu$m

SOFRADIR detector of the linear-array type: 288×4 elements nominal useful aperture at the centre of the field: f/2.9 focal length of the imager: 38.6 mm

NF: 4°×3°; WF: 8°×6° angle of deflection of the scanner: ±4° (±8° with additional optics)

magnification of the afocal:

NF: −4

WF: −2

What is claimed is:

1. Optical architecture for an infrared vision system with an optical axis, having an aperture stop, and comprising, in sequence:

means allowing the flux from a scene to be collected, an optical device forming an image of the scene, cooled detection means which include a detector located in the focal plane of the device and a cold stop, the architecture being characterized in that the aperture stop is separate from the cold stop and in that the cold stop has a shape partially vignetting the peripheral region of the trace of the useful rays coming from the scene so that the photometric inefficiency is smoothed out over the extent of the detector and/or is decreased, compared with the photometric inefficiency of a cold stop whose shape corresponds to the trace of the useful rays coming from the scene.

2. Optical architecture according to claim 1, characterized in that the aperture stop is located upstream of the cold stop and is physically formed by a conjugating mirror which delimits it and the reflecting face of which is turned towards the detector.

3. Optical architecture according to claim 1, characterized:

in that, between the means allowing the flux from the scene to be collected and the optical device forming an image of the scene, the optical architecture comprises scanning means which carry out horizontal scanning of the scene, in that the means allowing the flux from the scene to be collected are a front afocal, in that the optical device is a simple imager having one lens and being as close as possible to the scanning means, in that the detector is a linear-array-type detector, in that the aperture stop is located at the lens of the simple imager and is physically formed by a conjugating mirror which delimits it and the reflecting face of which is turned towards the detector.

4. Optical architecture according to claim 2, characterized in that the conjugating mirror is a spherical mirror.

5. Optical architecture according to claim 3, characterized in that the shape of the cold stop is approximately the shape of a hippodrome, having its large dimension in the vertical direction of the scene, having indentations at the vertical sides, these indentations being four in number and being symmetrical in pairs with respect to the horizontal and vertical axes of symmetry, and having flattened upper and lower ends.

6. Optical architecture according to claim 5, characterized in that the particular shape of the cold stop is the surface around the origin bounded by the following equations, y being the ordinate along the vertical axis of the scene and x the abscissa:

$|y|=4.25$ $|x|=[2.45-0.56(1-\cos(0.49y^2)]$ or any surface homothetical to the latter.

7. Optical architecture according to claim 3, characterized in that the front afocal comprises a sequence of only three lenses, the second lens, being free to move translationally, serving as a field-changing lens and also allowing close focusing and athermalization of the entire optical architecture.

8. Optical architecture according to claim 3, characterized in that the front afocal is placed with respect to the scanning means in such a way that the exit pupil of the front afocal is imaged on the scanning means and in that the diameter of the front lens of the front afocal is reduced to the dimension of the size in the horizontal direction of the entrance pupil of the entire optical architecture.

9. Camera having an optical architecture according to claim 1.

10. Pair of binoculars having an optical architecture according to claim 1.

11. Optical architecture according to claim 3, characterized in that the conjugating mirror is a spherical mirror.

12. Optical architecture according to claim 4, characterized in that the shape of the cold stop is approximately the shape of a hippodrome, having its large dimension in the vertical direction of the scene, having indentations at the vertical sides, these indentations being four in number and being symmetrical in pairs with respect to horizontal and vertical axes of symmetry, and having flattened upper and lower ends.

13. Optical architecture according to claim 4, characterized in that the front afocal comprises a sequence of only three lenses, the second lens, being free to move translationally, serving as a field-changing lens and also allowing close focusing and a thermalization of the entire optical architecture.

14. Optical architecture according to claim 5, characterized in that the front afocal comprises a sequence of only three lenses, the second lens, being free to move translationally, serving as a field-changing lens and also allowing close focusing and a thermalization of the entire optical architecture.

15. Optical architecture according to claim 6, characterized in that the front afocal comprises a sequence of only three lenses, the second lens, being free to move translationally, serving as a field-changing lens and also allowing close focusing and a thermalization of the entire optical architecture.

16. Optical architecture according to claim 4, characterized in that the front afocal is placed with respect to the scanning means in such a way that the exit pupil of the front afocal is imaged on the scanning means and in that the diameter of the front lens of the front afocal is reduced to the dimension of the size in the horizontal direction of the entrance pupil of the entire optical architecture.

17. Optical architecture according to claim 5, characterized in that the front afocal is placed with respect to the scanning means in such a way that the exit pupil of the front afocal is imaged on the scanning means and in that the diameter of the front lens of the front afocal is reduced to the dimension of the size in the horizontal direction of the entrance pupil of the entire optical architecture.

18. Optical architecture according to claim 6, characterized in that the front afocal is placed with respect to the scanning means in such a way that the exit pupil of the front afocal is imaged on the scanning means and in that the diameter of the front lens of the front afocal is reduced to the dimension of the size in the horizontal direction of the entrance pupil of the entire optical architecture.

19. Optical architecture according to claim 7, characterized in that the front afocal is placed with respect to the scanning means in such a way that the exit pupil of the front afocal is imaged on the scanning means and in that the diameter of the front lens of the front afocal is reduced to the dimension of the size in the horizontal direction of the entrance pupil of the entire optical architecture.

20. Camera having an optical architecture according to claim 2.

* * * * *